United States Patent [19]

Domesle et al.

[11] 4,450,244

[45] May 22, 1984

[54] CATALYST FOR THE COMBUSTION OF HARMFUL SUBSTANCES CONTAINED IN EXHAUST GASES OF INTERNAL COMBUSTION ENGINES OPERATED WITH ALCOHOL AND PROCESS FOR THE PRODUCTION OF THE CATALYST

[75] Inventors: Rainer Domesle, Maintal; Herbert Völker, Hanau; Edgar Koberstein, Alzenau; Hans-Dieter Pletka, Freigericht, all of Fed. Rep. of Germany

[73] Assignee: Degussa Aktiengesellschaft, Frankfurt am Main, Fed. Rep. of Germany

[21] Appl. No.: 415,635

[22] Filed: Sep. 7, 1982

[30] Foreign Application Priority Data

Sep. 18, 1981 [DE] Fed. Rep. of Germany ....... 3137169

[51] Int. Cl.³ .................. B01J 21/04; B01J 23/10; B01J 23/58
[52] U.S. Cl. ................... 502/185; 502/302; 502/303; 502/306; 502/314; 423/213.5
[58] Field of Search .............. 252/462, 466 PT; 423/213.5; 502/185, 302, 303, 306, 314

[56] References Cited

U.S. PATENT DOCUMENTS

| | | | |
|---|---|---|---|
| 3,409,390 | 11/1968 | Hoekstra | 252/466 B |
| 3,899,444 | 8/1975 | Stephens | 252/462 X |
| 4,188,309 | 2/1980 | Völker et al. | 252/465 X |
| 4,271,044 | 6/1981 | Fratzer et al. | 252/465 |

*Primary Examiner*—W. J. Shine
*Attorney, Agent, or Firm*—Beveridge, DeGrandi & Kline

[57] ABSTRACT

A catalyst is disclosed for combustion of pollutants contained in the exhaust gases of internal combustion engines operated with alcohol. The catalyst consists of a metal carrier, a coating deposited on it made of a catalytically active aluminum oxide and an amount of palladium deposited on said coating. A production process for the catalyst is described which provides a final activation in oxidizing atmosphere or a formation in the stream of the exhaust gas that is to be purified at certain temperatures as well as the use of the catalyst for the simultaneous elimination of aldehydes, alcohols, carbon monoxide and hydrocarbons present in the exhaust gas.

16 Claims, No Drawings

CATALYST FOR THE COMBUSTION OF HARMFUL SUBSTANCES CONTAINED IN EXHAUST GASES OF INTERNAL COMBUSTION ENGINES OPERATED WITH ALCOHOL AND PROCESS FOR THE PRODUCTION OF THE CATALYST

The invention relates to a catalyst for the combustion of harmful substances, especially of aldehydes, contained in the exhaust gases of internal combustion engines operated with alcohol, to a process for the production of this catalyst and its use.

Because of a worldwide shortage of energy, energy sources other then fuels made of crude oil distillates are used in an increasing amount for the operation of internal combustion engines. Thus, for example, in some countries, methanol, produced by the gasification of coal, or ethanol obtained by fermentation of a biomass with subsequent distillation, are used successfully.

Although the partial addition of alcohols to fuels for internal combustion engines up to a concentration of 15 vol. % is already quite customary, the conversion to pure alcohol engines which, for example, are operated only with ethanol or methanol has been accomplished only in a few countries in the initial stages, since the technical facilities for alcohol production on a large scale still need to be created.

In the exhaust gases of internal combustion engines operated with gasoline, aldehydes occur. However, internal combustion engines operated with alcohol emit a quantitative multiple of aldehydes. High aldehyde concentrations in the environmental air, however, do not only lead to an odor nuisance and to irritation of the mucous membranes, but beyond that—in the presence or absence of nitrogen monoxides—a photooxidation may take place, whereby phytotoxic substances are formed.

Thus, for example, so-called PAN (peroxiacetylnitrate, $CH_3CO_2ONO_2$) develops from acetaldehyde, oxygen and nitrogen pentoxide ($N_2O_5$), a compound to which the effect of the Los Angeles smog is to be mainly attributed.

Whereas a successful technology already exists for the elimination of the pollutants carbon monoxide, hydrocarbons and nitrogen monoxides, little is known concerning an effective control of the aldehydes in the exhaust gases of engines operated with alcohol.

Thus, it was found that particularly non-noble metal catalysts, such as for example, catalysts based on copper-chromic oxide, when used in the exhaust gas stream of an engine operated with alcohol, will increase, rather than decrease, the amount of aldehydes.

To be sure, known systems of oxidation catalysts based on platinum/palladium or platinum/rhodium on ceramic carriers may be used for the purification of aldehyde containing exhaust gases, but the result in most cases is unsatisfactory, since these catalyst systems are conceived for the higher exhaust gas temperature of internal combustion engines which are operated with fuels obtained from crude oil distillation.

In the case of alcohol engines however, the exhaust gas temperatures are considerably lower based on the considerably less energy content of their operating agent and of the desired lean method of operation. In the case of the use of traditional catalyst systems which are deposited on ceramic honeycomb bodies or bulk material carriers, this leads to difficulties, since these system, because of their relatively large space requirements, cannot be attached sufficiently close to the engine, that is to say in the zone where the exhaust gas is still sufficiently hot.

It was found surprisingly that palladium in combination with an aluminum oxide of the transition series which optionally is lattice-stabilized with alkaline earth metal oxides and/or oxides of the elements of the lanthanidene group, in the case of the conversion of aldehydes, alcohols and other impurities contained in the exhaust gas of alcohol operated internal combustion engines, produces good results, whenever these components of the catalyst are applied on a metallic structural reinforcer in the form of a temperature and corrosion resistant matrix through which gas may flow.

Consequently, a feature of the invention is a catalyst for the combustion of pollutants contained in exhaust gases of alcohol operated internal combustion engines. The catalyst is characterized by a matrix having continuous channels along a main axis and made of smooth and corrugated layers of high temperature resistant and scale resistant steel or of a steel with correspondingly resistant surface which layers are disposed alternately and are stacked into a package or rolled up spiralshaped into a wound body, a coating deposited thereon of an aluminum oxide of the transition series optionally containing about 0.5–20% by weight of one or more alkaline earth metals and/or rare earth metals in oxide form, and palladium deposited on the coating in amounts of 0.03–3% by weight, related to the total weight of coating and palladium.

By aluminum oxide of the transition series one is to understand active, i.e., catalytically active aluminum oxide which may contain the following crystallographically definable phases: $\gamma$, $\eta$, $\delta$, $\theta$, or $\rho$, $\kappa$ and $\chi$-aluminum oxide.

According to a preferred embodiment of the invention, the aluminum oxide of the transition series is lattice-stabilized with calcium-, strontium-, barium or cerium oxide and/or with combinations La—Nd, La—Nd—Ce or La—Nd—Pr—Ce, each as a mixture of the individual element oxides.

The metal matrix may be produced from corrugated and smooth, high temperature resistant, corrosion resistant scale resistant steel sheets disposed alternately one on the other. It may also consist of smooth and corrugated layers made of correspondingly resistent steel disposed alternately one on the other, whereby one layer made of corrugated sheet alternates with a layer of a smooth screen or one layer of smooth sheet metal alternates with one layer of corrugated screen, or one layer of corrugated screen alternates with one layer of a smooth screen. The smooth and/or corrugated layers may also be perforated metal sheets.

The layers of the metal matrix may be stacked into a package or may be wound up into a cylindrical, oval, rectangular or polygonal spiral. The corrugated layer may be shaped differently. It is desirable for it to be in sine curve form or the form of an evolvent or a rectangular, square or trapezoidal form.

The effectiveness of the catalyst depends to a considerable degree on the cell density of the matrix. For the purpose provided, it has been determined to be favorable for the matrix to have a cell density of 62 to 124 cells/$cm^2$.

As a metal for the matrix, alloys with the main components of iron, chromium, aluminum and optionally also cerium or yttrium, whereby the material for the creation of a surface favorable for anchoring is heated in an oxygen containing gas under conditions of temperature and time whereby a surface layer of aluminum oxide develops from the aluminum contained in the alloy. Thus, preferred embodiment of the invention provides for the matrix to consist of a ferritic chromium steel containing aluminum and having a cover of firmly adhering aluminum oxide.

The metal for the matrix however may also be a simple carbon steel or simple cast iron, which is covered with an aluminum-iron-diffusion layer obtained by tempering of aluminum coated steel or iron at high temperatures. Consequently, a variation of the invention which is especially preferred because of its low costs, provides that the matrix consist of a carbon steel coated with an Al-Fe-diffusion layer.

A further feature of the invention is a process for the production of the catalyst described.

The process is carried out by bringing the metal matrix into contact with a dispersion of the active aluminum oxide, then drying the produced aluminum oxide coating, thereafter tempering in air for 30–180 minutes at 600°–900°, preferably 700° C. and then impregnating with an aqueous solution containing a palladium salt, subsequently again drying and finally activating or forming the catalyst by heating to temperatures of 250°–650°, preferably 400°–500° C. in an oxidizing atmosphere or in the stream of the exhaust gas that is to be purified.

Whenever a matrix consisting of ferritic chromium steel containing aluminum is used, it will be tempered in air at 800°–1100° C. for 1–4 hours in order to produce an adhesion improving rough surface oxide layer prior to the application of the active aluminum oxide. This tempering treatment may also be applied to the starting components of the matrix.

Whenever a matrix consisting of a carbon steel at more favorable costs is to be used, then the latter is coated, for example, in a melting bath with aluminum and this compound material is exposed for at least one minute to a temperature in the range of 600°–1200° C. Normally, heating times between 5 and 12 minutes are used. In that case, a high temperature resistant, corrosion resistant and scale resistant surface layer develops of an aluminum iron alloy rich in aluminum and essentially free of aluminum oxide, which is strongly rugged and thus favorable for adhesion. The production of the aluminum-iron-diffusion layer may also take place already on the starting components of the matrix, i.e., prior to its production.

According to a further alternative of the process according to the invention, the long term activity of the catalyst may be improved considerably, whenever the aluminum oxide of the transition series is lattice stabilized. For this purpose, the invention provides that the active aluminum oxide is mixed with a salt or oxide of one or more alkaline earth metals and/or rare earth metals prior to application to the matrix and is then heated for 0.5 to 3 hours at 600°–1100° C. Essentially, element oxides or element oxide combinations are used for this purpose which are calcium-, strontium-, barium-, or cerium oxide and/or combinations La—Nd, La—Nd—Ce or La—Nd—Pr—Ce, always as mixtures of element oxides.

The invention finally also extends to the use of the catalyst described previously with regard to material and production, for the simultaneous elimination of aldehydes, alcohols, such as ethanol and methanol, carbon monoxide and hydrocarbons from the exhaust gases of internal combustion engines which are operated with alcohols such as methanol and ethanol as a fuel.

The catalyst according to the invention produces a series of surprising advantages. Thus, the use of palladium as an active component produces a surprisingly lower starting temperature for the catalytic reaction or higher conversion values at lower temperatures than do traditional oxidation catalysts on a platinum/palladium- or platinum/rhodium basis.

This advantage will be increased by the use of the metal matrices as structural reinforcement for the catalytic system. The lower heat capacity of the metal as compared to some ceramics permits quicker heating up of the catalyst and thus a rapid achievement of the operating temperature. Structural reinforcers on a ceramic base such as of cordierite or mullite, suffer a decreasing strength with increasing cell density, i.e., they must be relatively large in dimension.

As compared to that, the wall thicknesses of the metal sheets or screens used in the metal matrices permit a manufacture of considerably higher cell densities. This permits a very compact structure of the gas purification system and thus an installation close to the engine with optimum utilization of existing exhaust gas heat. This is important especially when operating an engine with alcohol fuel, because in this case, the exhaust gas temperatures are naturally lower. With the previously mentioned catalysts one will therefore achieve a rapid start-up of the conversion reaction and an increased conversion rate of the pollutants in case of a defined temperature profile in the exhaust gas line. These characteristics are especially important, because in the cold state of operation of an engine, most of the pollutants are emitted and a rapid initiation of the catalytic reaction decreases the total emission.

The invention is explained in more detail below in the following illustrative examples:

EXAMPLE 1

A steel band of 7.62 mm width and 0.05 mm thickness made of a chromium steel (15% Cr, 5% Al, remainder Fe) is corrugated in a trapezoidal shape by mechanical deformation and is wound up in the form of a spiral together with a smooth band in such a way that a cylindrical, structural reinforcer of 76.2 mm length and 25.4 mm diameter with a cell density of 62 cells/cm$^2$ develops on the front surfaces.

The structural reinforcer produced in this way is then degreased and is soldered together in the high vacuum at the front surfaces for mechanical strengthening. For the production of a surface favorable for anchoring, the structural reinforcing agent produced in such a way is tempered for 3 hours at a temperature of 950° C.

EXAMPLE 2 (COMPARATIVE EXAMPLE)

A structural reinforcer produced according to Example 1 is dipped into a 30% $\gamma$—Al$_2$O$_3$—suspension, excess suspension in the channels is removed by blowing out and the substrate is dried at 250° C. This process is repeated and in order to strengthen the Al$_2$O$_3$-layer, the catalyst carrier is tempered subsequently for 2 hours at 700° C. As a result, 14 g of Al$_2$O$_3$ of the transition series are found on the structural reinforcer with a specific surface area of approximately 120 m$^2$/g.

By dipping into a 3% by weight noble metal containing aqueous solution of H$_2$PtCl$_6$ and PdCl$_2$ altogether 0.04 g of platinum/palladium at a ratio of 5:2 is deposited on the so prepared substrate thereon. The excess solution is blown out with air and the catalyst is dried at 250° C. and is reduced after that for 1.5 hours in the hydrogen stream at 500° C.

EXAMPLE 3

The structural reinforcer produced according to Example 1 is provided with a coating of γ—$Al_2O_3$ containing lanthanum- and neodymium oxide at a 70/30 weight ratio. This is accomplished by dipping into a 30% by weight γ—$Al_2O_3$ containing aqueous suspension which additionally contains a mixture of the nitrates of the two rare earth metals at the stated ratio, corresponding altogether to 0.7% by weight of lanthanum- plus neodymiumoxide.

The excess suspension in the channels is removed after coating by blowing out with air and the coated reinforcer is dried at 250° C. This process is repeated and in order to strengthen the $Al_2O_3$-coating, the catalyst carrier is tempered subsequently for 2 hours at 700° C. As a result, 14 g of $Al_2O_3$ of the transition series with a specific surface of about 120 m²/g, are deposited on the structural strengthener doped with La/Nd-oxides.

By dipping into an aqueous solution of 4.7% by weight of $PdCl_2$, altogether 0.04 g of Pd are deposited onto the catalyst carrier prepared in this way. The excess solution is blown out with air and the catalyst is dried at 250° C. and is reduced after that for 1.5 hours in a hydrogen stream at 400° C.

EXAMPLE 4

A structural reinforcer produced according to Example 1 is dipped into a 30% γ—$Al_2O_3$ suspension. The excess suspension in the channels is removed after dipping by blowing it out with air and the coated reinforcer is dried at 250° C. This process is repeated and subsequently the catalyst carrier is tempered for 2 hours at 700° C. in order to strengthen the γ—$Al_2O_3$ coating. In this way, 14 g of aluminum oxide of the transition series are formed on the structural reinforcer with a specific surface area of approximately 120 m²/g.

Altogether 0.04 g of palladium are applied to the catalyst carrier prepared in this way by dipping it into a 6.5% by weight aqueous solution of palladium nitrate. The excess solution is blown out with air and the catalyst is dried at 250° C. and is then activated for 30 minutes in a hot stream of air of 500° C.

EXAMPLE 5

The catalysts produced according to Examples 2, 3 and 4 were aged with unleaded gasoline on the engine for 100 hours and subsequently were subjected to an activity test with two different, aldehyde containing gas mixtures (space velocity 50 000 h⁻¹).

| gas (a) | 70.25 vol. % $N_2$ | |
| --- | --- | --- |
| | 10 vol. % $CO_2$ | |
| | 15 vol. % $H_2O$ | |
| | 3.5 vol. % $O_2$ | (excess 0.375 vol. %) |
| | 0.75 vol. % $C_2H_5OH$ | |
| | 0.25 vol. % HCHO | |
| | 0.25 vol. % $CH_3CHO$ | |
| gas (b) | 67.87 vol. % $N_2$ | |
| | 10 vol. % $CO_2$ | |
| | 15 vol. % $H_2O$ | |
| | 4.5 vol. % $O_2$ | (excess 0.485 vol. %) |
| | 0.75 vol. % $C_2H_5OH$ | |
| | 0.25 vol. % HCHO | |
| | 0.25 vol. % $CH_3CHO$ | |
| | 1.33 vol. % $CO/H_2$ = 3/1 | |
| | 0.05 vol. % $C_3H_6$ | |

The determination of the conversions were carried out for CO with an infrared spectrometer, for HC with a flame ionization detector (FID) and for ethanol, formaldehyde and acetaldehyde by gas chromatography. The results are contained in Table 1 for gas mixture (a) and in Table 2 for gas mixture (b), and the start up temperatures in Table 3.

TABLE 1

| Cat. acc. to Example | Conversion | | |
| --- | --- | --- | --- |
| | $C_2H_5OH$ | HCHO | $CH_3CHO$ |
| (a) 350° C. | | | |
| 2 | 93 | 55 | 89 |
| 3 | 94 | 83 | 93 |
| 4 | 95 | 88 | 96 |
| (b) 400° C. | | | |
| 2 | 96 | 77 | 92 |
| 3 | 99 | 96 | 96 |
| 4 | 99 | 98 | 98 |

TABLE 2

| Cat. acc. to Example | Conversion | | | | |
| --- | --- | --- | --- | --- | --- |
| | $C_2H_5OH$ | HCHO | $CH_3CHO$ | CO | $C_3H_6$ |
| (a) 350° C. | | | | | |
| 2 | 96 | 62 | 91 | 100 | 94 |
| 3 | 98 | 89 | 98 | 100 | 96 |
| 4 | 98 | 90 | 100 | 100 | 96 |
| (b) 400° C. | | | | | |
| 2 | 98 | 81 | 96 | 100 | 100 |
| 3 | 100 | 96 | 100 | 100 | 100 |
| 4 | 99 | 99 | 100 | 100 | 100 |

TABLE 3

| Cat. acc. to Example | Start up Temperature | |
| --- | --- | --- |
| | Gas (a) | Gas (b) |
| 2 | 320 | 320 |
| 3 | 305 | 315 |
| 4 | 300 | 300 |

As the test results of Example 5 show, the catalysts according to the invention of Examples 3 and 4 are superior in their starting up behavior as well as conversion efficiency compared with the traditional catalysts according to Example 2. The pollutants are reduced to a much higher degree than by the comparative catalyst. However, also in the case of the conversion of acetaldehyde into the harmless components $CO_2$ and steam, there are still clear differences recognizable between the catalysts produced according to the invention and the catalyst produced according to Example 2.

EXAMPLE 6 (COMPARATIVE EXAMPLE)

A catalyst with a noble metal content of 1.52 g/l and the noble metals of Pt/Rh in a ratio of 11:1 is produced according to the process of Example 2. For the lattice stabilization, Ce(III)- and Zr(IV)-nitrate, corresponding to 8 g $CeO_2$ and 10 g $ZrO_2$ per liter of carrier volume were admixed to the γ—$Al_2O_3$—suspension.

EXAMPLE 7 (COMPARATIVE EXAMPLE)

A catalyst with a noble metal content of 1.41 g/l and the noble metals Pt/Pd in a ratio of 2:1 is produced according to the process of Example 2. For the lattice stabilization Ce(III)-nitrate, corresponding to 8 g $CeO_2$ per liter of carrier volume were admixed to the $\gamma$—$Al_2O_3$—suspension.

EXAMPLE 8

A catalyst with a noble metal content of 1.06 g/l is produced according to the process of Example 3. For the lattice stabilization, Ce(III)-nitrate, corresponding to 8 g $CeO_2$ per liter of carrier volume were admixed to the $Al_2O_3$ suspension.

EXAMPLE 9

The catalysts produced according to Examples 6, 7 and 8 were measured fresh and aged with the gas composition of Example 5 with regard to their start up behavior. The aging was accomplished in 4 hours at 850° C. in air. The results are contained in Table 4.

TABLE 4

| Cat. acc. to Example | Start up Temperature | |
|---|---|---|
| | Gas (a) | Gas (b) |
| (a) fresh | | |
| 6 | 195 | 192 |
| 7 | 190 | 191 |
| 8 | 215 | 219 |
| (b) aged | | |
| 6 | 265 | 270 |
| 7 | 260 | 272 |
| 8 | 210 | 219 |

Even with considerably lower content of noble metal, the catalyst according to the invention, after aging, shows a considerably better start up behavior than the comparative catalysts. Practically no deterioration has occurred in the start up temperature.

The preparation of and formation of the metal matrix described herein, that is, the formation of the structure of smooth and corrugated layer of high temperature resistant and scale resistant steel or a steel having a correspondingly resistant surface are matters that are described in the art.

Further modifications and variations will be apparent to those skilled in the art after reading the foregoing specification and are intended to be encompassed by the claims which follow.

We claim:

1. A catalyst for the combustion of harmful substances contained in exhaust gases of internal combustion engines operated with alcohol, comprising a matrix having continuous channels along a main axis, said matrix being made of smooth and corrugated layers of high temperature resistant and scale resistant steel or a steel having a correspondingly resistant surface, which layers are disposed in alternate arrangement, said layer having a coating thereon comprising an aluminum oxide of the transition series and an amount of palladium of about 0.03-3% by weight, in relation to the total weight of coating and palladium, being deposited on said coating.

2. The catalyst of claim 1, wherein the layers are arranged into a stacked package.

3. The catalyst of claim 1, wherein the layers are rolled into a spiral configuration.

4. The catalyst of claim 1, wherein the aluminum oxide of the transition series is lattice stabilized with calcium-, strontium-, barium- or cerium oxide and/or with the combinations La—Nd, La—Nd—Ce or La—Nd—Pr—Ce, always as a mixture of the individual element oxides.

5. The catalyst of claim 1, wherein the matrix has a cell density of 62 to 124 cells/cm$^2$.

6. The catalyst of claim 1, wherein the smooth and/or the corrugated layers consist of perforated metal sheets or screen.

7. The catalyst of claim 1, wherein the matrix consists of a ferritic chromium steel containing aluminum and having a cover of firmly adhering aluminum oxide.

8. The catalyst of claim 1, wherein the matrix consists of a carbon steel coated with an Al—Fe—diffusion layer.

9. A process for the production of the catalyst of claim 1, comprising bringing the metal matrix into contact with a dispersion of catalytically active aluminum oxide, to thereby deposit the active aluminum oxide on said matrix to form a coated matrix, thereafter drying the coated matrix, and tempering the coated matrix and thereafter impregnating said coated matrix with an aqueous solution containing a palladium salt, subsequently drying the coated matrix again and activating the catalyst by heating to temperatures of 250°-650°, in an oxidizing atmosphere or in the flow of the exhaust gas to be purified.

10. The process of claim 9, wherein the coated matrix is tempered in air for 30-180 minutes at temperatures of 600° to 900° C.

11. The process of claim 10, wherein the coated matrix is tempered at about 700° C.

12. The process of claim 9, wherein the coated matrix is subsequently activated at a temperature of 400°-500° C.

13. The process of claim 9, wherein the matrix consisting of ferritic chromium steel containing aluminum is tempered prior to application of the active aluminum oxide for 1-4 hours in air at 800°-1100° C.

14. The process of claim 9, wherein the matrix consisting of carbon steel is coated with aluminum prior to the application of the active aluminum oxide and thereafter is exposed for at least 1 minute to a temperature in the area of 600°-1200° C.

15. The process of claim 9, wherein the aluminum oxide of the transition series is mixed with a salt or an oxide of at least one alkaline earth metal and/or rare earth metal prior to application to the matrix and is then heated for 0.5-3 hours at 600°-1100° C.

16. The catalyst of claim 1, wherein said coating further comprises about 0.5-20% by weight, based on the weight of the aluminum oxide, of at least one alkaline earth metal and/or rare earth metal in oxide form.

* * * * *